(12) United States Patent
de Haas et al.

(10) Patent No.: US 12,212,431 B2
(45) Date of Patent: Jan. 28, 2025

(54) CONTROLLER AREA NETWORK NODE, CAN SYSTEM AND METHOD FOR THE NODE

(71) Applicant: NXP B.V., Eindhoven (NL)

(72) Inventors: Clemens Gerhardus Johannes de Haas, Ewijk (NL); Matthias Berthold Muth, Stelle (DE); Gerald Kwakernaat, Malden (NL); Lucas Pieter Lodewijk van Dijk, Kranenburg (DE)

(73) Assignee: NXP B.V., Eindhoven (NL)

( * ) Notice: Subject to any disclaimer, the term of this patent is extended or adjusted under 35 U.S.C. 154(b) by 71 days.

(21) Appl. No.: 18/334,028

(22) Filed: Jun. 13, 2023

(65) Prior Publication Data

US 2024/0007326 A1    Jan. 4, 2024

(30) Foreign Application Priority Data

Jun. 29, 2022  (EP) ..................................... 22182026

(51) Int. Cl.
*H04L 12/40*     (2006.01)

(52) U.S. Cl.
CPC .................. *H04L 12/40006* (2013.01); *H04L 2012/40215* (2013.01)

(58) Field of Classification Search
CPC ............... H04L 12/40006; H04L 2012/40215
See application file for complete search history.

(56) References Cited

U.S. PATENT DOCUMENTS

| | | | |
|---|---|---|---|
| 11,061,844 B2 * | 7/2021 | de Haas | G06F 13/4027 |
| 11,502,876 B2 * | 11/2022 | Walker | H04L 12/4135 |
| 11,527,114 B2 | 12/2022 | Walker et al. | |
| 11,722,327 B2 * | 8/2023 | Muth | H04L 25/0278 |
| | | | 370/438 |
| 11,764,995 B2 * | 9/2023 | Mueller | H04B 3/46 |
| | | | 375/219 |
| 11,870,603 B2 * | 1/2024 | van Dijk | H04L 12/40026 |
| 12,079,086 B2 * | 9/2024 | Mueller | H04L 12/40032 |
| 2011/0199131 A1 * | 8/2011 | Boezen | H04L 25/028 |
| | | | 327/109 |
| 2014/0035549 A1 * | 2/2014 | Hafizi | G05F 3/08 |
| | | | 323/311 |
| 2014/0091833 A1 * | 4/2014 | Astrom | H04L 25/0272 |
| | | | 326/31 |
| 2016/0149612 A1 | 5/2016 | Julson et al. | |
| 2018/0270169 A1 | 9/2018 | Daugherty, III | |
| 2019/0058614 A1 * | 2/2019 | de Haas | H04L 12/40032 |
| 2020/0252066 A1 * | 8/2020 | de Haas | H03M 9/00 |
| 2020/0373959 A1 | 11/2020 | Abouda et al. | |
| 2022/0376947 A1 * | 11/2022 | Antonsson | H04L 12/40 |

\* cited by examiner

*Primary Examiner* — Henry Tsai
*Assistant Examiner* — Christopher A Daley

(57) ABSTRACT

The present invention relates to a CAN node being configured to predict, based on the at least one response message and a reference response, a fault of the CAN network and to determine a fault location of the predicted fault of the CAN network. The present disclosure also relates to a CAN system and a method for the CAN node.

20 Claims, 6 Drawing Sheets

Fig. 3

| Fingerprint | relative output impedance | 124 ECU2 | 126 ECU3 | 128 ECU4 | 130 ECU5 | 132 ECU6 | 134 ECU7 | 136 ECU8 |
|---|---|---|---|---|---|---|---|---|
| 00 | 100% | ✓ | ✓ | ✓ | ✓ | ✓ | ✓ | ✓ |
| 02 | 80% | ✓ | ✓ | ✓ | ✓ | ✓ | ✓ | ✗ |

Fig. 5

| Fingerprint | relative output impedance | 124 ECU2 | 126 ECU3 | 128 ECU4 | 130 ECU5 | 132 ECU6 | 134 ECU7 | 136 ECU8 |
|---|---|---|---|---|---|---|---|---|
| 01 | 100% | ✓ | ✓ | ✓ | ✓ | ✓ | ✓ | ✓ |
| 01 | 90% | ✓ | ✓ | ✓ | ✓ | ✓ | ✓ | ✓ |
| 02 | 80% | ✓ | ✓ | ✓ | ✗ | ✓ | ✓ | ✗ |
| 03 | 70% | ✓ | ✓ | ✓ | ✗ | ✓ | ✓ | ✗ |
| 04 | 60% | ✓ | ✓ | ✓ | ✗ | ✗ | ✓ | ✗ |
| 05 | 50% | ✗ | ✓ | ✗ | ✗ | ✗ | ✗ | ✗ |
| 06 | 40% | ✗ | ✗ | ✗ | ✗ | ✗ | ✗ | ✗ |
| 07 | 30% | ✗ | ✗ | ✗ | ✗ | ✗ | ✗ | ✗ |
| 08 | 20% | ✗ | ✗ | ✗ | ✗ | ✗ | ✗ | ✗ |
| 09 | 10% | ✗ | ✗ | ✗ | ✗ | ✗ | ✗ | ✗ |

Fig. 6

| Fingerprint | relative output impedance | 124 ECU2 | 126 ECU3 | 128 ECU4 | 130 ECU5 | 132 ECU6 | 134 ECU7 | 136 ECU8 |
|---|---|---|---|---|---|---|---|---|
| 01-R | 90% | ∨ | ∨ | ∨ | ∨ | ∨ | ∨ | ∨ |
| 02-R | 80% | ∨ | ∨ | ∨ | ∨ | ∨ | ∨ | × |
| 03-R | 70% | ∨ | ∨ | ∨ | × | ∨ | ∨ | × |
| 04-R | 60% | ∨ | ∨ | ∨ | × | × | ∨ | × |
| 05-R | 50% | ∨ | ∨ | × | × | × | × | × |
| 06-R | 40% | × | ∨ | × | × | × | × | × |
| 07-R | 30% | × | ∨ | × | × | × | × | × |
| 08-R | 20% | × | × | × | × | × | × | × |
| 09-R | 10% | × | × | × | × | × | × | × |

Fig. 7

| Fingerprint | relative output impedance | 124 ECU2 | 126 ECU3 | 128 ECU4 | 130 ECU5 | 132 ECU6 | 134 ECU7 | 136 ECU8 |
|---|---|---|---|---|---|---|---|---|
| 01 | 90% | ∨ | × | ∨ | ∨ | ∨ | ∨ | ∨ |
| 02 | 80% | ∨ | × | ∨ | ∨ | ∨ | ∨ | × |
| 03 | 70% | ∨ | × | ∨ | × | ∨ | ∨ | × |
| 04 | 60% | ∨ | × | ∨ | × | × | ∨ | × |
| 05 | 50% | ∨ | × | ∨ | × | × | × | × |
| 06 | 40% | × | × | × | × | × | × | × |
| 07 | 30% | × | × | × | × | × | × | × |
| 08 | 20% | × | × | × | × | × | × | × |
| 09 | 10% | × | × | × | × | × | × | × |

# CONTROLLER AREA NETWORK NODE, CAN SYSTEM AND METHOD FOR THE NODE

CROSS-REFERENCE TO RELATED APPLICATIONS

This application claims priority under 35 U.S.C. § 119 to European patent application no. 22182026.9, filed Jun. 29, 2022, the contents of which are incorporated by reference herein.

TECHNICAL FIELD

The present disclosure relates to controller area network, CAN, node, a CAN system and a method for the CAN node.

BACKGROUND

CAN buses can be used for communications within vehicles. CAN bus is a message-based communications bus that is often used within automobiles. It will be appreciated that CAN buses also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. A CAN protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, relates to a new level scheme allowing even higher data rates. CAN XL is also integrated into the ISO11898-1:2015 standard.

SUMMARY

Aspects of the disclosure are defined in the accompanying claims.

In accordance with a first aspect of the present disclosure, a controller area network, CAN, node is provided. The CAN node comprising: a processing unit, a CAN BUS interface with at least two pins, via which the CAN BUS interface can be connected to a CAN network, a transmitter connected to the CAN BUS interface for sending signals via the CAN BUS interface, a receiver connected to the CAN BUS interface for receiving signals via the CAN BUS interface, and a CAN module, wherein the CAN module is connected to the pins and is adapted to adapt an output impedance between the pins, wherein the processing unit is configured to, in a test phase, control the CAN module such that the output impedance corresponds to a test impedance, and control the transmitter such that the transmitter transmits a test signal representing at least one test message, wherein the processing unit is configured to, in a response phase, control the CAN module such that the output impedance corresponds to a reference impedance, and receive, via the receiver, a response signal representing at least one response message in response to the at least one test message of the previous test phase, where the test impedance is smaller than the reference impedance, wherein a reference response is stored by the CAN node, and wherein the processing unit is configured to, in an evaluation phase, predict, based on the at least one response message and the reference response, a fault of the CAN network and/or determine a fault location of the predicted or an existing fault of the CAN network.

In one or more embodiments, the processing unit is configured to, in an initiation phase, control the CAN module such that the output impedance corresponds to the reference impedance, and control the transmitter such that the transmitter sends an initiation signal announcing a test phase following the initiation phase.

In one or more embodiments, the processing unit is configured to be in the initiation phase prior to the first change to the test phase.

In one or more embodiments, the processing unit is configured to, in a demand phase, control the CAN module such that the output impedance corresponds to the reference impedance, and control the transmitter such that the transmitter transmits a demand signal representing an instruction to generate a response message in response to a receipt of the at least one test message.

In one or more embodiments, the processing unit is configured to be in the demand phase prior to the first change to the response phase.

In one or more embodiments, each response message represents the number of test messages received during the respective test phase and/or wherein each response message indicates whether the at least one test message was received error free.

In one or more embodiments, the reference response represents at least one response message in response to a test signal sent by the transmitter at an output impedance corresponding to the reference impedance.

In one or more embodiments, the processing unit is configured to, in a reference phase, control the CAN module such that the output impedance corresponds to the reference impedance, control the transmitter such that the transmitter transmits the test signal representing the at least one test message, and receive, via the receiver, a reference response representing at least one response message in response to the at least one test message of the reference phase.

In one or more embodiments, the processing unit is configured to be in the reference phase prior to the change to the initiation phase.

In one or more embodiments, the processing unit is configured to directly or indirectly change during a test cycle from the test phase in which the associated steps are executed to the response phase in which the associated steps are executed, and wherein the processing unit is configured to repeat the test cycle, wherein the test impedance for each repetition of the test cycle is reduced compared to the test impedance for the previous test cycle.

In one or more embodiments, the test impedance for each repetition of the test cycle is reduced by at least 5%, preferably by at least 10%, compared to the test impedance for the previous test cycle.

In one or more embodiments, the test cycle further comprises the initiation phase and the demand phase.

In accordance with a second aspect of the present disclosure, a controller area network, CAN, system is provided. The CAN system comprising: a master CAN node being formed by a CAN node according to any of the preceding claims, a CAN network connected to the CAN BUS interface of the master CAN node, several CAN nodes, each of which is referred to as a participant CAN node, wherein each participant CAN node comprises a processing unit, a CAN BUS interface with at least two pins via which the CAN BUS interface is connected to the CAN network, a transmitter connected to the CAN BUS interface for transmitting signals via the CAN BUS interface, and a receiver connected to the CAN BUS interface for receiving signals via the CAN BUS interface, wherein the processing unit of each participant CAN node is configured to, in a reaction phase, receive, via the receiver of the respective participant CAN node, a test signal representing at least one test message, and in response to the at least one test message, controlling the transmitter of the respective participant CAN node such that the transmitter transmits a response message representing the error-free reception of the at least one test message and/or the number of error-free received test messages.

In one or more embodiments, the master CAN node is configured in accordance with claim 2, wherein the processing unit of each participant CAN node is configured to change to the reaction phase if the receiver of the respective participant CAN node receives an initiation signal.

In one or more embodiments, the processing unit of the master CAN node is configured to predict, in the evaluation phase, based on the response messages of the participant CAN nodes and the reference response, a fault of the CAN network and/or to determine a fault location of the predicted or an existing fault of the CAN network.

In one or more embodiments, the processing unit of the master CAN node is configured to compare, for each response phase, the response messages received in the respective response phase with the reference response, such that a comparison result is formed for each response phase, and wherein the processing unit of the master CAN node is configured to predict, based on the at least one comparison result, a fault of the CAN network and/or to determine a fault location of the predicted or an existing fault of the CAN network.

In accordance with a third aspect of the present disclosure, a method for a Controller Area Network, CAN, node is provided. The method comprising a processing unit, a CAN BUS interface having two pins via which the CAN BUS interface can be connected to a CAN network, a transmitter connected to the CAN BUS interface for transmitting signals via the CAN BUS interface, a receiver connected to the CAN BUS interface for receiving signals via the CAN BUS interface, and a CAN module, wherein the CAN module is connected to the pins and is adapted to adapt an output impedance between the pins, wherein the method is configured to change from a test phase to a response phase, the method comprising, for the test phase, the steps a) to b): a) controlling the CAN module by the processing unit such that the output impedance corresponds to a test impedance (90%), and b) controlling the transmitter by the processing unit such that the transmitter transmits a test signal representing at least one test message, the method comprising, for the response phase, the steps c) to d): c) controlling the CAN module by the processing unit such that the output impedance corresponds to a reference impedance, and d) receiving a response signal via the receiver, the response signal representing at least one response message in response to the at least one test message of the previous test phase, where the test impedance is smaller than the reference impedance, wherein a reference response is stored by the CAN node, and wherein the method is configured to change from the response phase to an evaluation phase, and wherein the method comprises, for the evaluation phase, the steps e) and/or f): e) predicting a fault of the CAN network by the processing unit based on the at least one response message and the reference response, and f) determining a fault location of the predicted or an existing fault of the CAN network by the processing unit based on the at least one response message and the reference response.

In accordance with a fourth aspect of the present disclosure, a computer program is provided, comprising executable instructions which, when executed by a processing unit, cause the processing unit being configured to carry out the method of the XXX aspect and/or one or more embodiments thereof.

DESCRIPTION OF DRAWINGS

Embodiments of the present disclosure will be described in more detail with reference to the appended drawings, in which:

FIGS. 3, 5, 6 and 7 show each a table with fingerprints.

DESCRIPTION OF EMBODIMENTS

Communication using a CAN protocol is often considered reliable. An error in the transmission of a message can be detected, for example, by calculating a checksum based on the incorrectly transmitted message.

Based on an incorrectly transmitted message, however, it is not possible with known prior art technology to trace back where the error occurred. For example, it cannot be detected on the basis of the incorrectly transmitted message whether the error occurred on the path between the sending node and the receiving node.

Furthermore, the detection of an error with known prior art technology based on an erroneously transmitted message is only possible at the time if the erroneous transmission actually occurs. As long as messages are transmitted without errors, it is not possible to deduce from the message transmitted without errors whether an error may soon occur in the message transmission.

In addition, errors in the transmission of messages between a sender node and a receiver node may occur only occasionally. For example, faulty message transmission may only occur if high ambient temperatures exist and/or if strong interfering signals affect message transmission. Finding the cause of an error in message transmission has often proven to be very difficult and/or costly in practice. For example, if a fault is sought in a vehicle CAN system for message transmission using a CAN protocol while the vehicle is in a workshop, lower ambient temperatures may exist and/or low interference signals may affect the message transmission. As a consequence of the better circumstances, often no faulty transmission of messages occurs, so that the fault is often not found. It is therefore not uncommon for many components of the vehicle CAN system to be replaced in order to prevent the sporadically occurring error in message transmission. However, the replacement of many components causes high costs, which should be avoided.

Figure 1:
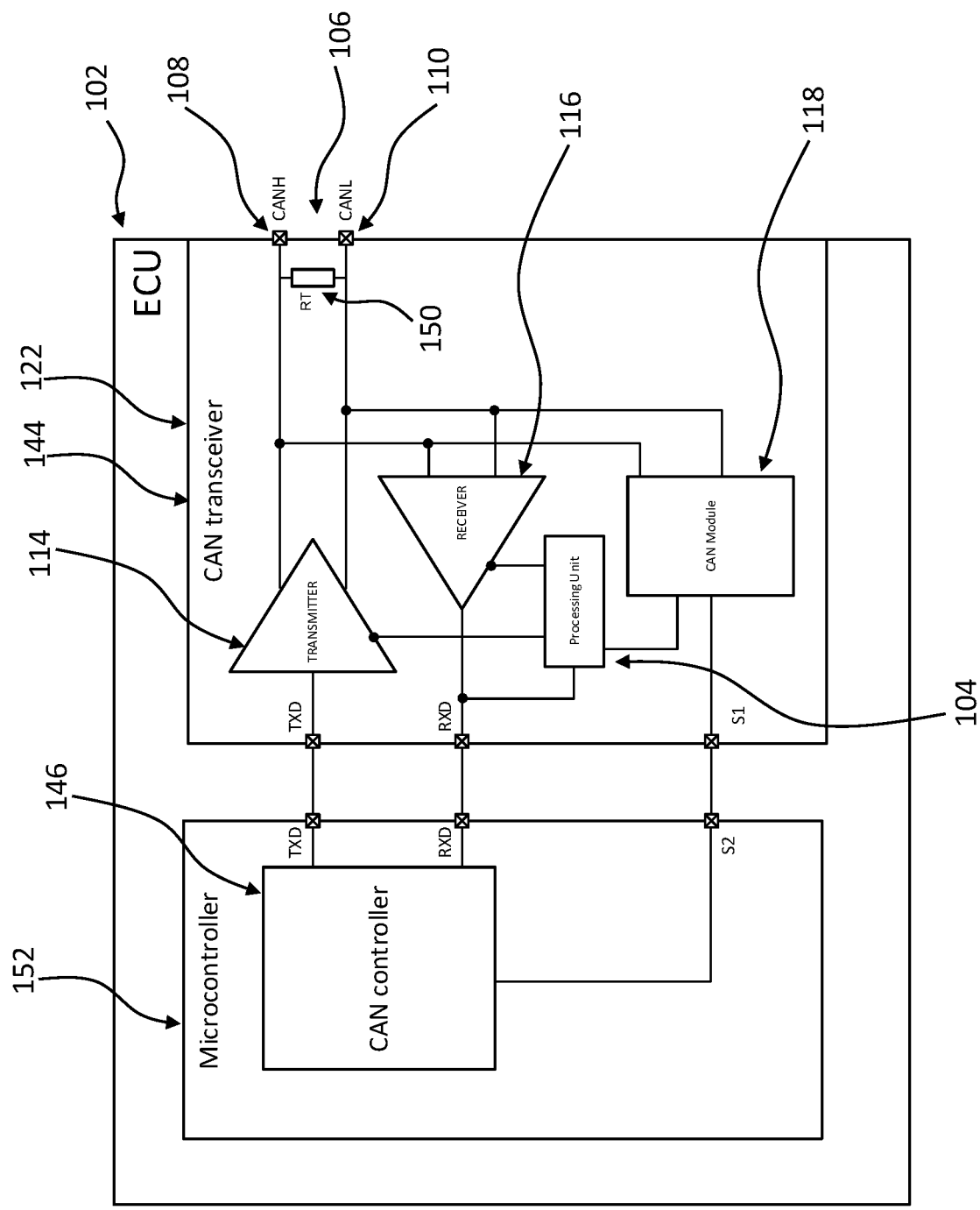
FIGS. 1 and 4 show each an embodiment of a simplified block diagram of a CAN node.

FIG. 1 schematically illustrates a simplified block diagram of a CAN node 122 according to the present disclosure. The CAN node 122 may overcome the previously mentioned disadvantages.

The CAN node 122 includes a processing unit 104, a CAN BUS interface 106, a transmitter 114, a receiver 116, and a CAN module 118. The CAN BUS interface 106 includes two pins 108, 110 through which the CAN BUS interface 106 may be connected to a CAN network 112. The CAN network 112 may also be referred to as a CAN BUS network. The CAN network 112 does not form a part of the CAN node 122.

Figure 2:
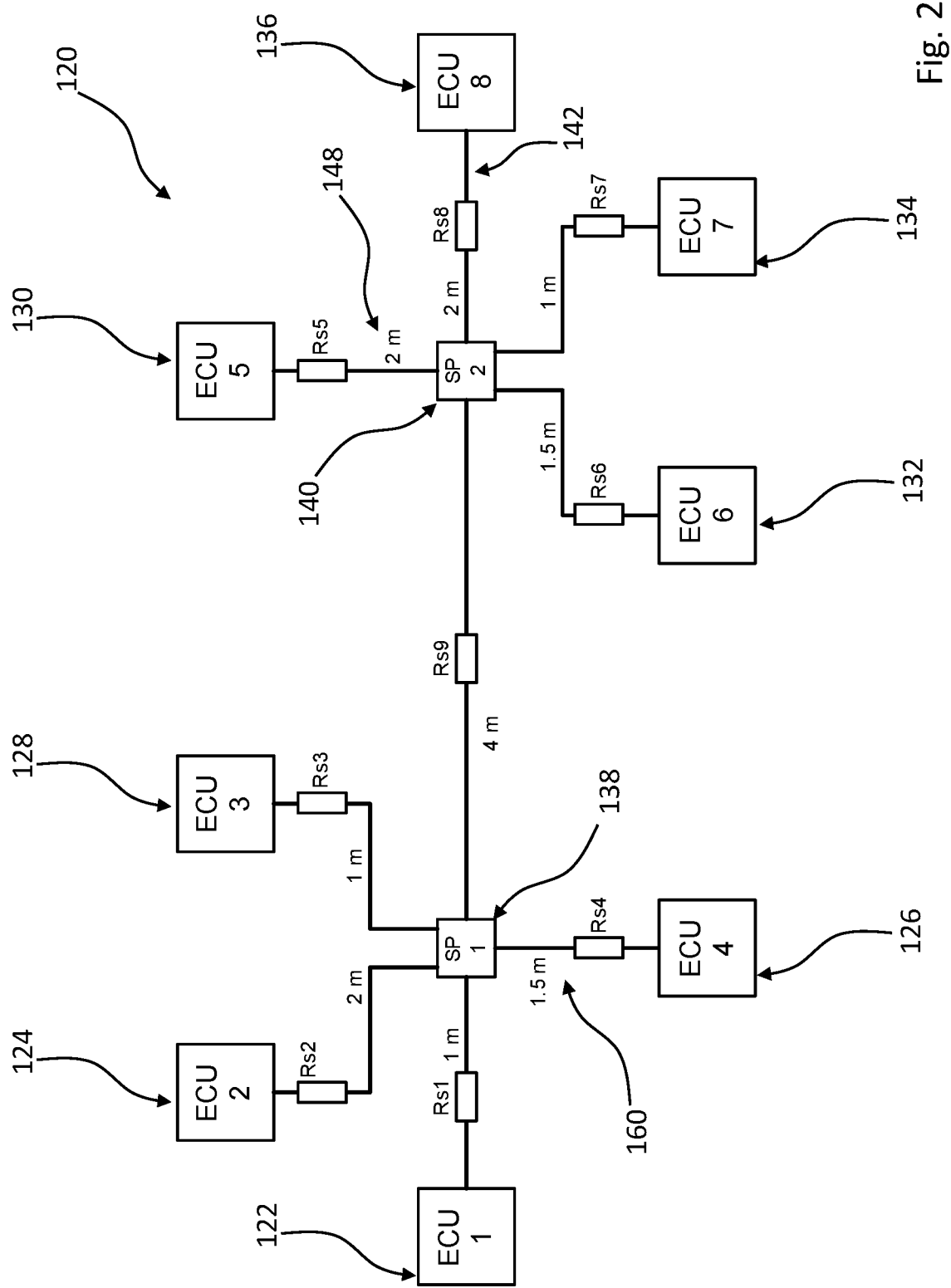
FIG. 2 shows an embodiment of a simplified block diagram of a CAN system.

FIG. 2 schematically illustrates a simplified block diagram of a CAN system 120 according to the present disclosure. The CAN system 120 comprises a plurality of CAN nodes 122, wherein one of the CAN nodes 122 may be referred to as a master CAN node 122 and the remaining CAN nodes 122 may be referred to as participant CAN nodes 124-136. A CAN network 112 extends between the CAN nodes 122, 124-136. The CAN network 112 may be configured to transmit signals in accordance with the CAN standard among the CAN nodes 124-136. The CAN network 112 may comprise branches 142, 148, 160, which are preferably formed by two wire lines, and switches 138, 140.

Via the pins 108, 110 of the CAN BUS interface 106 of the CAN node 122 of FIG. 1, the CAN node 122 can be connected to a CAN network 112, such as the CAN network 112 of FIG. 2. The transmitter 114 of the CAN node 122 is connected to the CAN BUS interface 106, such that the transmitter 114 is configured to transmit signals via the CAN BUS interface 106. Further, the receiver 116 of the CAN node 122 is connected to the CAN BUS interface 106 such that the receiver 116 is configured to receive signals via the CAN BUS interface 106. The transmitted and/or received signals may represent messages according to the CAN standard. The CAN module 118 of the CAN node 122 is also connected to the pins 108, 110 of the CAN BUS interface 106.

An electrical impedance exists between pin 108 of the CAN BUS interface 106 and pin 110 of the CAN BUS interface 106, which is referred to as the output impedance. Because of the previously mentioned connections to pins 108, 110 of the CAN BUS interface 106, the transmitter 114, the receiver 116 and the CAN module 118 have an influence on the output impedance. The influence of the transmitter 114 and the receiver 116 on the output impedance is often fixed and/or set a predefined value. In an example, the transmitter 114 and the receiver 116 may each form a partial impedance acting in parallel as well as between pins 108, 110 of the CAN BUS interface 106. Another partial impedance may be effected by the CAN module 118, which is also connected in parallel with the aforementioned partial impedances, so that the resulting output impedance actually acting between the pins 108, 110 results from the parallel connection of the partial impedances. The CAN module 114 is configured to change and thus adapt the output impedance between the pins 108, 110. In an example, the CAN module 114 may be configured to change the partial impedance of the CAN module 114 acting between the pins 108, 110 such that a corresponding change and/or adaptation of the output impedance between the pins 108, 110 may be caused. By changing its partial impedance, the CAN module 114 may therefore cause a preferably arbitrary reduction in the output impedance effectively acting between the pins 108, 110.

Faulty message transmission in real CAN systems often only occurs visibly under certain environmental conditions and/or certain disturbance conditions. If the environmental conditions are not present or the disturbances do not exist, the faulty message transmission may not occur.

Against this background, by means of the CAN module 114, it is possible to reduce the signal strength of a signal transmitted by the transmitter 114 by reducing the output impedance so that an erroneous message transmission occurs even under better environmental conditions and/or with low interference. As a result, the CAN module 114 can be used to make a potential error visible and/or detectable that otherwise occurs only occasionally and/or under certain ambient and/or interference conditions.

However, even if the message transmission is not faulty even under poor environmental conditions or if interference occurs, the CAN module 114 can be used to determine whether a faulty message transmission is to be expected in the future. For example, by means of the CAN module 114, it is possible to reduce the signal strength of a signal transmitted by the transmitter 114 by reducing the output impedance between the pins 108, 110 so that a message transmission error visibly occurs that would otherwise only occur due to aging or other degradation of the CAN network 112. The amount of reduction in output impedance until the first visible occurrence of the error in message transmission may represent the remaining robustness to erroneous message transmissions.

In order to prevent many parts of a CAN system 21 from being replaced with new parts on suspicion if a faulty message transmission has not yet occurred but is to be expected, it is desirable to be able to identify which part of a CAN network 112 could cause an imminent faulty message transmission.

Against this background, the processing unit 104 of the CAN node 122 is configured to perform different steps for different phases. In principle, the output impedance may first be reduced by CAN module 118 of the CAN node in a test phase to send a test signal under the reduced output impedance by means of the transmitter 114. The test signal represents at least one test message. Each test message may comprise at least one frame including a plurality of bits. Each frame and/or test message may be configured in accordance with the CAN standard. In the response phase following the test phase, the output impedance may be increased again to receive a response signal under the increased output impedance and thus under better conditions. The response signal should be a response of a participant CAN module 124-136 to the test signal. If, for example, the response signal indicates that the test message was received without errors, there is still good robustness against potentially occurring errors in the message transmission. If, on the other hand, the response signal indicates that the test message was not received without error, then it is suspected that an error in the regular message transmission will soon occur in the future.

Therefore, based on the principle previously explained, it is provided for the processing unit 104 to be configured to control the CAN module 108 in the test phase such that the output impedance between the pins 108, 110 corresponds to a test impedance. The test impedance is less than a reference impedance, wherein the output impedance between pins 108, 110 would correspond to the reference impedance if the CAN module 118 causes no change or the smallest possible change in the output impedance. For example, in an example, the test impedance may be at least 10% less than the reference impedance. In another example, the output impedance is not reduced by the CAN module 118 if it is desired to cause the output impedance to be equal to the reference impedance. In another example to reach the same effect, the CAN module 118 is configured to change the output impedance such that the output impedance corresponds to the test impedance. The value of the test impedance may be predefined or represented by a control signal transmitted to the processing unit 104. The processing unit may control the CAN module 118 based on the control signal.

The processing unit 104 is further configured to control the transmitter 114 during the test phase, in particular after the output impedance corresponds to the test message, such that the transmitter 114 transmits a test signal representing the at least one test message. Preferably, the transmitter 114 transmits the test signal via the CAN BUS interface 106, and the at least one test message may be predefined. Alternatively, however, it is also possible to use regular messages to be transmitted by a transmitter 114 anyway as test messages. If there is a faulty transmission of one of the regular messages used as test messages, the respective message can be sent again after the fault has been detected.

Preferably, the test signal represents multiple test messages that are sent to different participants CAN nodes 124-136. In response to a received test message, each participant CAN node 124-136 may generate a response message and send this response message over the CAN network 112 to the CAN node 122 from which the test signal was sent. However, before the response messages are generated and sent, it is preferred that the processing unit 104 of the CAN node 122 enter the response phase. Each response message may indicate whether the at least one test message was received without error by the respective participant CAN node 124-136. Alternatively or additionally, each response message may indicate the number of test messages received by the respective participant CAN node 124-136.

In a response phase, the processing unit 104 is configured to control the CAN module 118 such that the output impedance corresponds to a reference impedance. As a result, the output impedance may correspond to the reference impedance during the whole response phase. This allows response messages to be received particularly well and/or particularly robust to interference. In an example, the reference impedance is provided solely by the transmitter 114 and the receiver 116. The reference impedance may also be provided by an additional terminating resistor 150. Preferably, exactly two CAN nodes 122, 124-136 of the CAN system 120 have a terminating resistor 150. Furthermore, it is preferably provided that the reference impedance is not formed by an impedance of the CAN module 118. In another example, the reference impedance corresponds to the largest possible output impedance that is possible by changing the output impedance by means of the CAN module 118.

Further, in the response phase, while the output impedance is equal to the reference impedance, the processing unit 104 is configured to receive, via the receiver 116, a response signal representing the at least one response message in response to the at least one test message of the previous test phase. Although the response messages may be generated by different participant CAN nodes 124-136, the response messages are preferably transmitted to the CAN node 122 in a staggered manner rather than simultaneously. Therefore, the receiver 116 of the CAN node 122 receives a response signal that may represent the multiple response messages. In an example, if only one response message is generated solely by a single participant CAN node 124, the response signal may represent that single response message only.

A reference response is also stored by the CAN node 122. This reference response may include and/or represent one or more reference response messages. The reference response may be trigged by sending a test signal at an output impedance corresponding to the reference impedance. The test signal causes a response signal representing one or more response messages, referred to as reference response messages. The number of reference response messages corresponds to the number of participants CAN nodes 124, 126, 128. In an example, the reference response represents at least one reference response message in response to a test signal sent by the transmitter 114 having an output impedance corresponding to the reference impedance.

Preferably, the reference response messages are also received at an output impedance equal to the reference impedance. Furthermore, the reference response messages are used to be encompassed by or represented by the reference response. Therefore, the reference response comprises and/or represents the best possible response messages in response to the test signal. In an example, the reference response is generated immediately after the CAN system 120 is manufactured. However, in another example, it is also possible that a reference response is generated at another time. If the CAN system 120 is expanded to include additional participant CAN nodes 124-136, it may be appropriate to regenerate the reference response.

Turning again back to the end of the response phase (which follows the test phase), it is to be noted that after the CAN node 122 receives the response signal via the receiver 116 in the response phase, the processing unit 104 may change to an evaluation phase. In the evaluation phase, the processing unit 104 is configured to predict a potential fault of the CAN network 112 and/or determine a fault location of the predicted fault or an existing fault of the CAN network 112 based on the at least one response message (of the response signal) and the reference response. In an example, a potential fault is a fault that is likely to actually occur in the future, preferably during regular operation. In regular operation, the output impedance is preferably equal to the reference impedance. However, aging of the CAN network 112 may occur in the future, such that the potential fault is likely to occur as an actual fault as the CAN network 112 ages.

The CAN module 118 of the CAN node 122 is connected to the pins 108, 110 and is configured to change (the value of) the output impedance between the two pins 108, 110. Preferably, the CAN module 118 is configured to change the output impedance so that the output impedance is in a range between (the value of) the reference impedance and (a value of) a minimum impedance that is less than the reference impedance. For example, the minimum impedance may be between 90% and 10% of the reference impedance. In another example, the minimum impedance may be between 50% and 10% of the reference impedance.

FIG. 3 shows an example of a table in which two possible values for the output impedance are given. For the larger value, the output impedance is 100% of the reference impedance. For the smaller value, the output impedance is 80% of the reference impedance.

In case the output impedance is 100% of the reference impedance, a check mark symbol is shown in the respective row of the table of FIG. 3 for each node CAN node 124-136. A checkmark symbol indicates that the corresponding node CAN node 124-136 has responded with a response message to a test message received without errors, so that the respective response message does not indicate any errors.

In case the output impedance is 80% of the reference impedance, a check mark symbol is shown in another respective row of the table in FIG. 3 for each participant CAN node 124-136, except for a participant CAN node 136. For the node CAN node 136 an X symbol is shown. The X symbol indicates that the associated participant CAN node 136 has responded with a response message to a received faulty test message, where the response message indicates the associated fault, or that the participant CAN node 136 has not responded with a response message to a test message. Against this background, it is very likely that a fault will occur in the branch 142 of the CAN network 112 in the future, such as if the CAN network 112 ages and/or is subject to strong interference.

Each (except the top) row (00 and 02) of the table in FIG. 3 represents a fingerprint indicating the output impedance in relation to the reference impedance and, for each node CAN node 124-136, whether the respective participating CAN node 124-136 has received a test message sent with the respective output impedance from the master CAN node 122 without error (check mark symbol) or not (X symbol). The fingerprints are numbered by "00" and "02" so that each fingerprint can be referred to by its associated number. In an example, the processing unit 104 may be configured to generate at least one fingerprint 02 with an output impedance that is less than the reference impedance, for instance 80% of the reference impedance. The fingerprint 00 may be referred to as the reference fingerprint 00, as the corresponding output impedance is 100% of the reference impedance. In an example, the processing unit 104 may be configured to predict, based on the at least one fingerprint 02 and the reference fingerprint 00, a potential fault in the CAN network 112 and/or an associated fault location of the potential fault in the CAN network 112. As a result, the reference fingerprint 00 of FIG. 3 may be associated with the reference response. Further, the fingerprint 01 of FIG. 3 may be associated with a response message.

Each of the response messages received in the response phase is a response to the at least one test message sent during the test phase, where the output impedance is equal to the test impedance. The test impedance is intentionally chosen to be smaller than the reference impedance so that actual errors shall occur that would otherwise occur only, for example, if the CAN network 112 has experienced an aging and/or an degradation. If an actual error occurs as a transmission error during the test phase, at least one test message has not been received without error by at least one of the participant CAN nodes 124, so that the respective participant CAN node 124 generates a response message indicating the actual error. Via the receiver 116, the CAN module 122 receives the response signal in the response phase, the response signal representing the at least one response message in response to the at least one test message. In each response message indicating an unexpected error, the respective response message of the respective participant CAN node 124-136 differs from the reference response message of the same participant CAN node 124, 126, 128.

Preferably, the processing unit is configured to detect whether the at least one response message represented by the response signal indicates an unexpected error that is not indicated by the corresponding reference response message. If a positive detection of the corresponding difference is made by the processing unit 118, the positive detection also simultaneously predicts a fault of the CAN network 112 that is likely to occur in the future even under better conditions. The positive detection therefore allows a prediction of the potential fault of the CAN network 112 by the processing unit 104. In an example, a potential fault is a fault that is likely to actually occur in the future, preferably also during regular operation of the CAN system 120.

In an example, the reference response comprises and/or represents at least one reference response message. Preferably, the reference response comprises and/or represents an associated reference response message for each participant CAN node 124-136 of the CAN system 120. Each reference response message may indicate the associated participant CAN node 124-136. Therefore, the reference response may indicate which participants CAN nodes 124-136 should respond to a received test message with a response message.

In an example, the processing unit 104 may be configured to detect whether the response signal received during the response phase includes a response message from each participant CAN node 124-136. The processing unit 104 may determine the number and/or identifiers of the participant CAN nodes 124-136 based on the reference response. If a positive detection occurs that at least one of the participants CAN nodes 124-136 has not generated a response message in response to a test message, the positive detection also simultaneously predetermines a potential fault of the CAN network 112 that is likely to occur in the future even under better conditions of the CAN network 112. Also this positive detection gives a prediction of the potential fault of the CAN network 112 by the processing unit 104.

If the CAN system 120 comprises a plurality of participant CAN nodes 124-136, each participant CAN node 124-136 should generate a response message in response to a received test message in the response phase and send it to the CAN node 122 via the CAN network 112. Each response message may represent from which participant CAN node 124-136 the respective response message has been generated. If a transmission error occurs during the test phase, at least one response message will indicate the error. Based on the at least one response message indicating the error, it may be inferred which part and/or branch 142, 148, 160 of the CAN network 112 is causing an error.

In an example, a circuit topology of the CAN network 112 may be stored by the processing unit 104. The circuit topology may represent, for each participant CAN node 124-136, the branches 142, 148, 160 of the CAN network 112 to be used to transmit a message from the CAN node 122 to the respective participant CAN node 124-136. The CAN node 122 may also be referred to as the master CAN node 122.

For example, if two response messages each indicate an actual fault, each of the two response messages indicating an associated participant CAN node 124-136, the processing unit 104 may be configured to infer from the two response messages and the circuit topology that the potential fault is most likely to be expected in a branch 142, 148, 160 of the CAN network 112 necessary to transmit both response messages each indicating the fault. In an example, the processing unit 104 may be configured to determine a faulty branch 142, 148, 160 of the CAN network 112 based on the at least one response message and the circuit topology. Preferably, the reference response from the processing unit 104 is further used for this purpose.

In another example, if a single response message alone indicates a fault, wherein this response message also indicates the associated participant CAN node 124-136, it may be inferred by means of the processing unit 104 from the response message and the circuit topology that the fault is caused by a branch 142, 148, 160 of the CAN network 112 used exclusively to transmit that response message indicating the fault.

As a result, a fault location (preferably in terms of a branch 142, 148, 160) of a predicted (and potential) fault of the CAN network 112 may be determined by means of the processing unit 104 based on the at least one response message, the reference response, and preferably further based on the circuit topology.

Each CAN node 122, 124-136 may also be designated as a CAN device 102 including a CAN transceiver 144 and a CAN controller 146.

In another example, the CAN node 122 may be formed solely by a CAN transceiver 144. In this case, the CAN node 122 may also be referred to as the CAN transceiver 144. For example, FIG. 1 shows a simplified block diagram for a CAN transceiver 144 that includes all elements of the CAN node 122.

Figure 4:
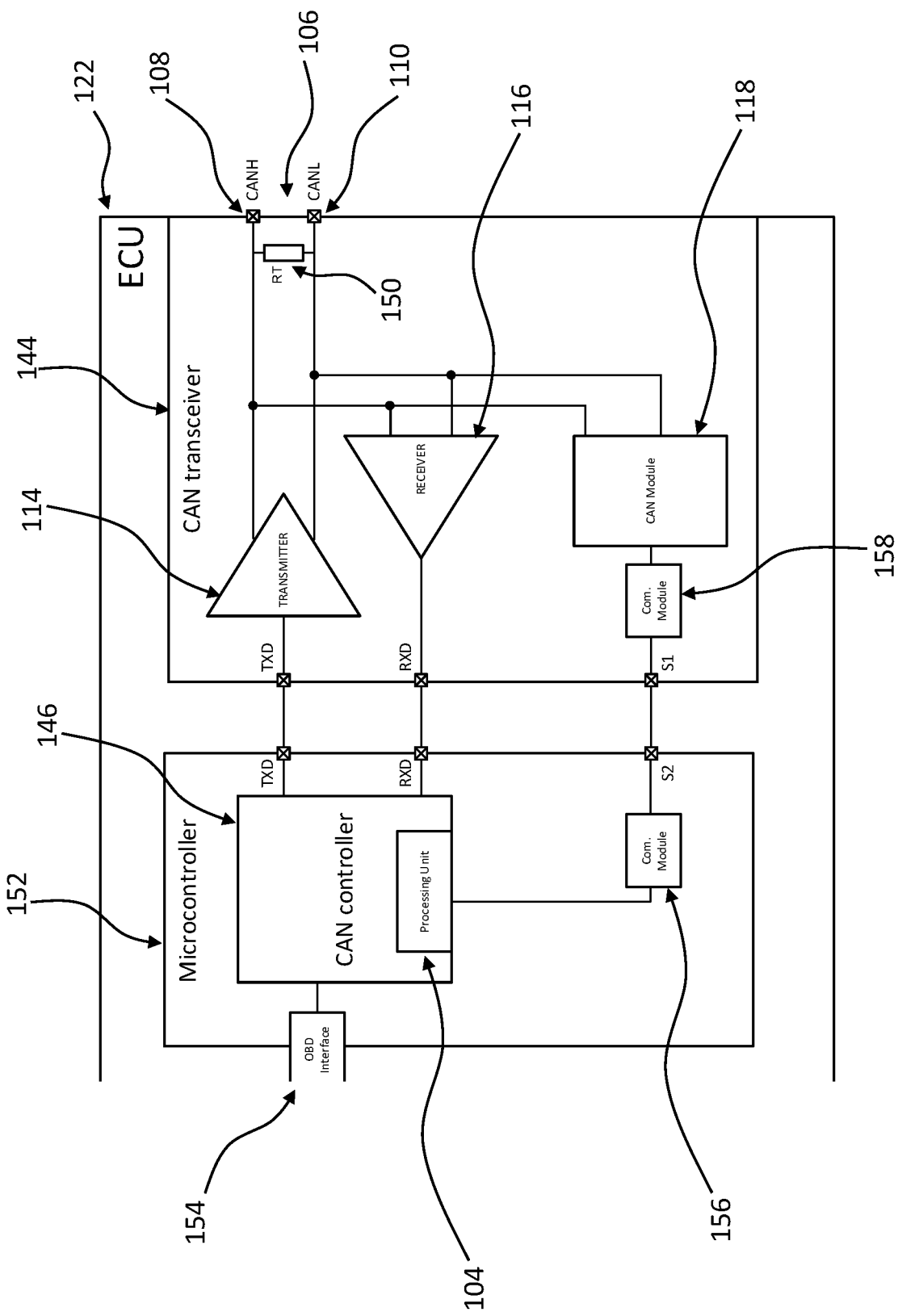

In another example, the CAN node 122 may be formed by a CAN device 102 including the CAN controller 146 and a CAN transceiver 144, wherein the elements of the CAN node 122 are implemented by the CAN controller 146 and the CAN transceiver 144 together. For example, FIG. 4 illustrates a simplified block diagram for a CAN node 122 formed by the CAN device 102 wherein the processing unit 104 is formed by the CAN controller 146 and wherein the CAN BUS interface 106, the transmitter 114, the receiver 116, and the CAN module 118 are formed by the CAN transceiver 144.

In an example, the CAN module 118 may be integrated with another module or unit of the CAN node 122. For example, the CAN module 118 may be an integrated part of the processing unit 104.

In an example, it may be advantageous to inform the participant CAN nodes 124-136 that a test phase and/or transmission of a test signal is coming soon. In an example, the processing unit 104 may be configured to control the CAN module 118 during an initialization phase such that the output impedance corresponds to the reference impedance and, preferably while the output impedance corresponds to the reference impedance, to control the transmitter 114 such that the transmitter 114 transmits an initiation signal announcing a test phase subsequent to the initialization phase. Preferably, the transmitter 114 transmits the initiation signal via the CAN BUS interface 108. Each of the participant CAN nodes 124-136 may enter a response mode upon receiving the initiation signal, such that a response message is generated in response to a received test message. This is particularly advantageous if the test message does not contain an instruction that a response message is to be generated by the participant CAN node 124-136 in response to the received test message. If, for example, a regular message is used unchanged as a test message, the initiation signal should be sent beforehand so that a response message is actually generated subsequently by the respective participant CAN node 124-136 in case a test message is received.

In an example, the processing unit 104 may be configured such that the processing unit 104 is in the initialization phase prior to changing to the test phase. For example, the processing unit 104 may start with the initialization phase to switch to the test phase after sending the initiation signal.

To the extent that a participant CAN node 124-136 has received a test message, but the participant CAN node 124-136 does not send a response message in response to the received test message, it may be advantageous to prompt the participant CAN node 124-136 to send a response message in response to the received test message. In an example, the processing unit 104 is configured to control the CAN module 118 in a demand phase such that the output impedance is equal to the reference impedance. Further, in the demand phase, preferably while the output impedance is equal to the reference impedance, the processing unit 104 may be configured to control the transmitter 114 such that the transmitter transmits a demand signal representing an instruction to generate a response message in response to a receipt of a test message. Preferably, the transmitter transmits the demand signal via the CAN BUS interface 106, and the demand signal may be received by each participant CAN node 124-136. Each participant CAN node 124-136 may generate a response message based on the demand signal, provided that the respective participant CAN node 124-136 has previously received a test message. In the demand signal, the test message may be indicated so that the participant CAN node 124-136 can recognize the test message among possibly a plurality of already received messages. Using the demand signal may improve the reliability of predicting, in particular predetermining a potential fault in the CAN network 112.

In an example, the processing unit 104 is configured such that the processing unit 104 is in the demand phase prior to changing, in particular switching to the response phase. In an example, the processing unit 104 may be configured to switch to the demand phase after the end of the test phase and to switch to the response phase after the end of the demand phase. By the demand phase being between the test phase and response phase, it may be achieved that the demand to send the response messages is triggered before the processing unit switches to the response phase and thus to receive the response messages.

In an example, the test signal may represent only one associated test message for each participant CAN node 124-136. Therefore, several test messages may be represented by the test signal if, for example, several participants CAN nodes 124-136 are provided. In another example, however, it is also possible that the test signal represents several associated test messages for each participant CAN node 124-136. The multiple test messages provided for a participant CAN node 124-136 may be different or the same. In an example, the test messages for the same participant CAN node 124-136 are sent at different output impedances during the test phase.

In an example, during a test cycle, the processing unit 104 is configured to directly or indirectly change, in particular switch from a test phase, in which the associated steps are executed, to the response phase, in which the associated steps are executed. For example, in a test cycle, the steps of the test phase may be executed first and then the steps of the response phase may be executed. In other words, the test cycle may comprise and/or be formed by a test phase and a subsequent response phase.

In an example, the processing unit is configured to repeat the test cycle, wherein the test impedance for each repetition of the test cycle is reduced from the test impedance for the previous test cycle. In an example, the test impedance for each repetition of the test cycle may be reduced by at least 5% from the test impedance for the previous test cycle. In another example, the test impedance for each repetition of the test cycle may be reduced by at least 10% from the test impedance for the previous test cycle. In an example, the test impedance for the first test cycle may be between 95% of the reference impedance and 70% of the reference impedance.

In an example, the test impedance for the first test cycle is 90% of the reference impedance. For each repetition of the test cycle, the test impedance is preferably reduced by 10% of the reference impedance. In an example, a fingerprint is created with each test cycle. FIG. 5 represents an example of a table with nine fingerprints from nine consecutive test cycles. In the first test cycle, in which the test impedance is 90% of the reference impedance, fingerprint 01 is generated. In the second test cycle, in which the test impedance corresponds to 80% of the reference impedance, fingerprint 02 is generated. In this way, a corresponding fingerprint is generated for each subsequent test cycle.

In fingerprint 01 of the table in FIG. 5, no X symbol is shown for any of the participant CAN nodes 124-136. Consequently, none of the participant CAN nodes 124-136 has received an erroneous test message. For fingerprint 02 of the table in FIG. 5, the output impedance was reduced by another 10% so that the output impedance corresponds to 80% of the reference impedance. In the fingerprint 02, an X symbol is shown for each of the two participant CAN nodes 130, 136 in the table of FIG. 5. The X symbol indicates that the respective participant CAN node 130, 136 has sent a response message in response to a test message, where the response message indicates an erroneously received test message. It is to be evaluated by means of the processing unit 104 whether an erroneous reception of the test message by the two participants CAN nodes 130, 136 was to be expected.

In an evaluation phase, the processing unit 104 is configured to predict a potential fault of the CAN network 112 based on the at least one response message and the reference response. Each response message may correspond to a fingerprint. In an example, the processing unit 104 may be configured to predict a potential fault of the CAN network 112 in an evaluation phase based on the at least one fingerprint and the reference response. The reference response may also correspond to a fingerprint, referred to as a reference fingerprint. However, the reference fingerprint does not correspond to the previously mentioned fingerprints of FIG. 5 or to a response signal received during the response phase. The reference fingerprint may correspond to a reference response received during a reference phase.

In the reference phase it is ensured that the CAN network 112 is error-free. For example, the reference phase is executed directly after the manufacturing of the CAN network 112 or directly after the manufacturing of the CAN system 120. Preferably, the reference phase is timed before the initialization phase. In an example, the processing unit 104 is configured to change from the reference phase to a regular operation and, during the regular operation, to the initialization phase or to the test phase. Therefore, the reference phase precedes the initial test phase in terms of time. The test phase is often executed during (regular) operation of the CAN system 120. There may therefore be a certain and/or long period of time between the reference phase and the first execution of the test phase. During the test phase, it is not ensured that the CAN network 112 is error-free.

In an example, the processing unit 104 is configured, in the reference phase, to control the CAN module 118 such that the output impedance corresponds to the reference impedance. Further, during the reference phase, preferably while the output impedance corresponds to the reference impedance, the processing unit 104 is configured to control the transmitter 114 such that the transmitter 114 transmits a test signal representing at least one test message. The test signal during the reference phase may correspond to the test signal from the test phase. Further, during the reference phase, preferably while the output impedance corresponds to the reference impedance, the processing unit 104 is configured to receive, via the receiver 116, a reference response representing at least one response message in response to the at least one test message of the reference phase. Compared to the test phase, the reference phase preferably differs in that the output impedance corresponds to the reference impedance throughout the reference phase.

The reference response received during the reference phase may correspond to a corresponding reference fingerprint that is used by the processing unit 104 to compare, for example, the fingerprint 02 of FIG. 5 with the reference fingerprint and predict a potential fault of the CAN network 112 based on the comparison result. In an example, the fingerprint 00 of FIG. 3 may represent a reference fingerprint. In another example, the processing unit 104 may be configured to compare each fingerprint of FIG. 5 to the fingerprint 00 of FIG. 3 (in this example, as a reference fingerprint). From the comparison results, the processing unit 104 may determine, for example for the fingerprint 02, that an actual error occurred in the message transmission to the participant CAN nodes 130, 136 at an output impedance equal to 80% of the reference impedance. The error in the message transmission to the participant CAN node 136 may be an expected error in the message transmission. Expected errors as a function of the reduced output impedance may be stored by the processing unit 104. The error in the message transmission to the participant CAN node 130 may be an unexpected error in the message transmission. Based on the fingerprint 02 of FIG. 5 and the fingerprint of FIG. 3, the processing unit 104 may thus predict a potential error of the CAN network 112, for example a potential error in the branch 148 of the CAN network 112.

Previously, it was explained that during the reference phase, the output impedance is preferably the same as the reference impedance. In an alternative embodiment, it is possible that the output impedance is changed during the reference phase, which is explained below by means of examples.

In an example, the processing unit 104 is configured to repeatedly execute a reference cycle during the reference phase. In an example, the processing unit 104 is configured to, for each reference cycle, (i) control the CAN module 118 such that the output impedance corresponds to a test impedance, (ii) control the transmitter 114, while the output impedance corresponds to the test impedance, such that the transmitter 114 transmits a test signal representing at least one test message, (iii) after transmitting the test signal, controlling the CAN module 118 such that the output impedance corresponds to the reference impedance, and (iv) while the output impedance corresponds to the reference impedance, receiving via the receiver 116 a response signal representing at least one reference response message in response to the at least one test message of the previously transmitted test signal. Preferably, the test impedance is less than the reference impedance if the reference cycle is executed for the first time during the reference cycle, preferably at least 5% less or at least 10% less than the reference impedance. In an example, the test impedance for each repetition of the reference cycle is reduced from the test impedance for the previous reference cycle. In an example, the test impedance for each repetition of the reference cycle may be reduced by at least 5%, preferably by at least 10%, relative to the test impedance for the previous reference cycle.

The reference cycle is very similar to the test cycle explained earlier. However, the reference cycle is executed before the first execution of the test cycle. Preferably, therefore, the advantageous explanations, preferred features, effects and/or advantages are referred to for the reference cycle in an analogous manner as they have been explained for the test cycle. It should be noted that the reference cycle is executed in the reference phase, in which it is preferably ensured that the CAN network 112 is error-free. The test cycle, on the other hand, is executed in connection with the test phase and the response phase, so that it is not ensured that the CAN network 112 is error-free for the test cycle.

In an example, the test impedance for the first reference cycle is 90% of the reference impedance. For each repetition of the reference cycle, the test impedance is preferably reduced by 10% of the reference impedance. In an example, a reference fingerprint is created with each reference cycle. FIG. 6 represents an example of a table with nine reference fingerprints 01-R to 09-R from nine consecutive reference cycles. In the first reference cycle, in which the test impedance is 90% of the reference impedance, fingerprint 01-R is generated. In the second reference cycle, in which the test impedance corresponds to 80% of the reference impedance, the fingerprint 02-R is generated. In this way, a corresponding fingerprint is generated for each subsequent reference cycle.

In the fingerprint 01-R of the table in FIG. 6, no X symbol is shown for any of the participant CAN nodes 124-136. Consequently, none of the participant CAN nodes 124-136 has received an erroneous test message. For the fingerprint 02-R of the table in FIG. 6, the output impedance was reduced by another 10% so that the output impedance corresponds to 80% of the reference impedance. In the fingerprint 02-R, only for the participant CAN node 136 an X symbol is shown in the table of FIG. 6, whereas for the remaining participants CAN nodes 124-134 a checkmark symbol is indicated in the table of FIG. 6. The X symbol preferably indicates that the participant CAN node 136 has sent a response message in response to a test message, where the response message indicates a test message received in error. From the reference fingerprint 02-R of FIG. 6, it can be seen that an erroneous message transmission to the participant CAN node 136 is expected if the output impedance is reduced to 80% of the reference impedance. Furthermore, it can be seen from the reference fingerprint 02-R of FIG. 6 that an error-free message transmission to the participant CAN node 130 is to be expected if the output impedance is reduced to 80% of the reference impedance.

In an example, the reference fingerprints may be used for the reference response and the corresponding fingerprints may be used for the response messages from the response phase. Against this background, the processing unit 104 may be configured to predict a potential fault of the CAN network 112 and/or an associated fault location in the evaluation phase based on the fingerprints and the reference fingerprints. In an example, the processing unit 104 may be configured to compare the fingerprint 02 of FIG. 5 with the reference fingerprint 02-R of FIG. 6 and determine a fault in the message transmission to the participant CAN node 130 based on the comparison result. The further erroneous message transmission to the participant CAN node 136 was expected based on the comparison, so this erroneous message transmission is not indicative of a potential fault of the CAN network 112. In other words, the processing unit 104 may be configured to predict a potential fault of the CAN network 112 and/or an associated fault location based on the differences between the fingerprints and the reference fingerprints. Such a difference is present with respect to the participant CAN node 130, such that the processing unit 104 is able predict, if also the circuit topology is used, the potential fault in the branch 148 of the CAN network 112.

During regular operation of the CAN system 120, the output impedance is usually not reduced by the CAN module 118, so that the predicted error also does not directly occur during regular operation after the end of the test phase. By executing the test cycles and due to the preferred configuration of the processing unit 104, which may predict a potential fault and/or fault location during the evaluation phase, knowledge may be gained that a fault is imminent and/or likely to occur in the future, particularly as the CAN network 112 ages and/or degrades, even before the fault has actually occurred during regular operation of the CAN network 112. Measures may therefore be taken to initiate repair work on the CAN network 112 in a timely manner prior to the occurrence of the fault during regular operation. This may minimize downtime and associated costs.

In order to achieve a higher reliability with respect to the prediction of a potential fault of the CAN network 112 and/or with respect to the fault location of the predicted fault, a plurality of different fingerprints 01 to 09 at different output impedances may be generated by means of the processing unit 104, wherein these fingerprints 01 to 09 are compared with corresponding reference fingerprints 01-R to 09-R by means of the processing unit 104, in order to predict a potential fault of the CAN network 112 and/or an associated fault location based on the comparison results, wherein the processing unit may also use circuit topology for determining and/or predicting the fault location.

FIG. 7 shows another example of a table comprising nine fingerprints 01-09 that have been derived from the response messages a response phase. In this context, reference is made to the preceding explanations in an analogous manner. If the fingerprints 01-09 are compared with the reference fingerprints 01-R to 09-R from FIG. 5 with respect to the participant CAN node 126, it can be seen for the participant CAN node 126 that unexpected errors in the message transmission occur even with a small reduction in the output impedance. The comparison of the fingerprints 01-09 with the reference fingerprints 01-R to 09-R also shows that no unexpected error occurs in the message transmission to the other participant nodes 124, 128-136. Therefore, it can be inferred from the comparison results that the unexpected errors are caused exclusively by a branch 160 of the CAN network 112 that is to be used exclusively for transmitting messages to the participant CAN node 126. From FIG. 2 (and in an analogous manner from the circuit topology stored by the processing unit 104), it can be clearly taken that this must be the branch 160 of the CAN network 112. Preferably, the processing unit 104 of the CAN node 122 is configured to identify, based on the comparison results between the fingerprints 01-09 and the reference fingerprints 01-R to 09-R and based on the stored circuit topology, the at least one branch 160 of the CAN network 112 that caused the fault that occurred during the test phase. Further, the processing unit 104 may be configured to determine a potential fault of the CAN network 112 and/or the associated fault location from the fault identified for the test phase and based on the circuit topology. Preferably, the circuit topology stored by the processing unit 104 represents the arrangement of the branches 142, 148, 160 and preferably the connection between the branches 142, 148, 160 and/or with switches 138, 140 of the CAN network 112.

In FIG. 2, an example of a CAN system 120 is schematically shown by a simplified block diagram. The CAN system 120 comprises a master CAN node 122, which may be formed by a CAN node 122, shown for example in FIG. 1. Furthermore, the CAN system 120 comprises a CAN network 112. The CAN BUS interface 106 of the master CAN node 122 is connected to the CAN network 112. The CAN network 112 may include a plurality of branches 142, 148, 160 and one or more switching devices 138, 140. Each branch 142, 148, 160 may have a two-wire line, which may be able to transmit a differential voltage signal. The CAN system 120 further comprises a plurality of participant CAN nodes 124-136. The CAN network 112 extends between the CAN nodes 122-136 of the CAN system 120, and each or at least one participant CAN node 124-136 may be similarly or even identically equipped to the master CAN node 122. In another example, each or at least one participant CAN node 124-136 may be equipped with a lower feature set than the master CAN node 122. Each participant CAN node 124-136 includes a processing unit, a CAN BUS interface having two pins through which the CAN BUS interface of the respective participant CAN node is connected to the CAN BUS network 112, a transmitter connected to the CAN BUS interface for transmitting signals through the CAN BUS interface of the respective participant CAN node 124-136, and a receiver also connected to the CAN BUS interface for receiving signals through the CAN BUS interface. The processing unit of each participant CAN node 124-136 is configured to, in a response phase, (i) receive a test signal representing at least one test message via the receiver of the respective participant CAN node 124-136, and (ii) in response to the at least one test message, control the transmitter of the respective participant CAN node 124-136 such that the transmitter of the respective participant CAN node 124-136 transmits a response message via the CAN network 112 representing the receipt of the at least one test message and/or the number of test messages received. The processing unit of each participant CAN node 124-136 may further be configured to verify whether a test message was received without errors or with errors. Further, the processing unit of each participant CAN node 124-136 may be configured to indicate in the respective response message whether the associated test message was received without errors or with errors.

In an example, the processing unit of each participant CAN node 124-136 may be configured to switch to the reaction phase if the receiver of the respective participant CAN node 124-136 receives an initiation signal. The initiation signal may be sent by the master CAN node 122 in the initialization phase.

Figure 8:
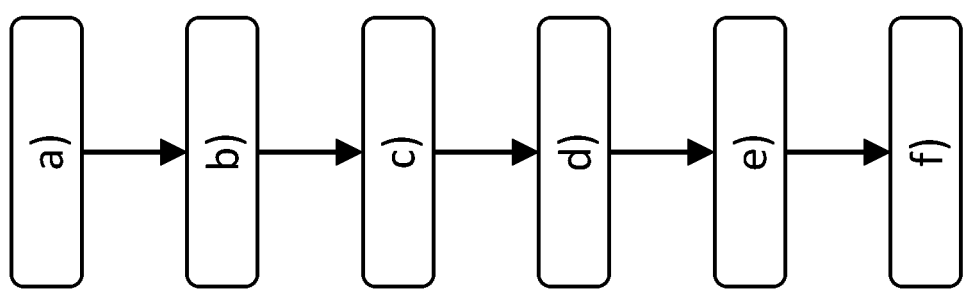
FIG. 8 shows a simplified flow chart of a method for the CAN node.

FIG. 8 schematically illustrates a flowchart for an example of a method for a CAN node 122. In an example, the CAN node 122 is formed by the CAN node 122 previously explained in connection with FIG. 1. For the test phase, the method comprises steps a) and b):

a) Control of the CAN module 118 by the processing unit 104 of the CAN node 122, such that the output impedance corresponds to a test impedance that is less than a reference impedance;

b) Control of the transmitter 114 of the CAN node 122 by the processing unit 104 such that the transmitter 114 transmits a test signal representing at least one test message.

The method is also configured to switch from the test phase to a response phase. For the response phase, the method comprises steps c) and d):

c) Control of the CAN module 118 by the processing unit 104 of the CAN node 122 so that the output impedance corresponds to a reference impedance;

d) Receiving a response signal via the receiver 116 of the CAN module 122, the response signal representing at least one response message in response to the at least one test message of the previous test phase.

Preferably, the reference response is stored by the CAN node 122, and further preferably by the processing unit 104. Further, the method is configured to transition from the response phase to an evaluation phase.

For the evaluation phase, the procedure comprises steps e) and/or f):

e) Predicting a potential fault of the CAN network 112 by the processing unit 104 based on the at least one response message and the reference response;

f) Determining a fault location of the predicted fault of the CAN network 112 based on the at least one response message and the reference response.

For the method, reference is made to the advantageous explanations, preferred features, technical effects and benefits as previously explained in an analogous manner to FIGS. 1-7.

Although the described exemplary embodiments disclosed herein focus on devices, systems, and methods for using same, the present disclosure is not necessarily limited to the example embodiments illustrate herein. For example, various embodiments of providing The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A controller area network (CAN) node comprising:
   a processing unit,
   a CAN BUS interface with two pins, via which the CAN BUS interface can be connected to a CAN network,
   a transmitter connected to the CAN BUS interface for sending signals via the CAN BUS interface,
   a receiver connected to the CAN BUS interface for receiving signals via the CAN BUS interface, and
   a CAN module,
   wherein the CAN module is connected to the pins and is adapted to adapt an output impedance between the pins,
   wherein the processing unit is configured to, in a test phase,
   control the CAN module such that the output impedance corresponds to a test impedance, and control the transmitter such that the transmitter transmits a test signal representing at least one test message,
   wherein the processing unit is configured to, in a response phase,
   control the CAN module such that the output impedance corresponds to a reference impedance, and
   receive, via the receiver, a response signal representing at least one response message in response to the at least one test message of the test phase,
   where the test impedance is smaller than the reference impedance,
   wherein a reference response is stored by the CAN node, and
   wherein the processing unit is configured to, in an evaluation phase,
   predict, based on the at least one response message and the reference response, a fault of the CAN network and/or determine a fault location of the predicted or an existing fault of the CAN network.

2. The CAN node of claim 1, wherein the processing unit is configured to, in an initiation phase, control the CAN module such that the output impedance corresponds to the reference impedance, and control the transmitter such that the transmitter sends an initiation signal announcing a test phase following the initiation phase.

3. The CAN node of claim 1, wherein the processing unit is configured to, in a demand phase, control the CAN module such that the output impedance corresponds to the reference impedance, and control the transmitter such that the transmitter transmits a demand signal representing an instruction to generate a response message in response to a receipt of the at least one test message.

4. The CAN node of claim 1, wherein each response message represents the number of test messages received during the respective test phase and/or wherein each response message indicates whether the at least one test message was received error free.

5. The CAN node of claim 2, wherein the reference response represents at least one response message in response to a test signal sent by the transmitter at an output impedance corresponding to the reference impedance.

6. The CAN node of claim 5, wherein the processing unit is configured to, in a reference phase, control the CAN module such that the output impedance corresponds to the reference impedance, control the transmitter such that the transmitter transmits the test signal representing the at least one test message, and receive, via the receiver, a reference response representing at least one response message in response to the at least one test message of the reference phase.

7. The CAN node of claim 6, wherein the processing unit is configured to be in the reference phase prior to the change to the initiation phase.

8. The CAN node of claim 1, wherein the processing unit is configured to directly or indirectly change during a test cycle from the test phase in which the associated steps are executed to the response phase in which the associated steps are executed, and wherein the processing unit is configured to repeat the test cycle, wherein the test impedance for each repetition of the test cycle is reduced compared to the test impedance for a previous test cycle.

9. The CAN node of claim 8, wherein the test impedance for each repetition of the test cycle is reduced by at least 5%, preferably by at least 10%, compared to the test impedance for the previous test cycle.

10. The CAN node of claim 9, wherein the test cycle further comprises an initiation phase and a demand phase, wherein the processing unit is configured to, in the initiation phase, control the CAN module such that the output impedance corresponds to the reference impedance, and control the transmitter such that the transmitter sends an initiation signal announcing a test phase following the initiation phase, and wherein the processing unit is configured to, in the demand phase, control the CAN module such that the output impedance corresponds to the reference impedance, and control the transmitter such that the transmitter transmits a demand signal representing an instruction to generate a response message in response to a receipt of the at least one test message.

11. A controller area network (CAN) system, comprising:
a master CAN node being formed by the CAN node of claim 1,
a CAN network connected to the CAN BUS interface of the master CAN node,
several CAN nodes, each of which is referred to as a participant CAN node,
wherein each participant CAN node comprises a processing unit, a CAN BUS interface with two pins via which the CAN BUS interface is connected to the CAN network, a transmitter connected to the CAN BUS interface for transmitting signals via the CAN BUS interface, and a receiver connected to the CAN BUS interface for receiving signals via the CAN BUS interface,
wherein the processing unit of each participant CAN node is configured to, in a reaction phase,
receive, via the receiver of the respective participant CAN node, a test signal representing at least one test message, and
in response to the at least one test message, controlling the transmitter of the respective participant CAN node such that the transmitter transmits a response message representing the error-free reception of the at least one test message and/or the number of error-free received test messages.

12. The CAN system of claim 11, wherein the master CAN node is configured in accordance with claim 2, wherein the processing unit of each participant CAN node is configured to change to the reaction phase if the receiver of the respective participant CAN node receives an initiation signal.

13. The CAN system of claim 12, wherein the processing unit of the master CAN node is configured to predict, in the evaluation phase, based on the response messages of the participant CAN nodes and the reference response, a fault of the CAN network and/or to determine a fault location of the predicted or an existing fault of the CAN network.

14. The CAN system of claim 12, wherein the processing unit of the master CAN node is configured to compare, for each response phase, the response messages received in the respective response phase with the reference response, such that a comparison result is formed for each response phase, and wherein the processing unit of the master CAN node is configured to predict, based on the comparison result, a fault of the CAN network and/or to determine a fault location of the predicted or an existing fault of the CAN network.

15. A method for a Controller Area Network (CAN) node comprising a processing unit, a CAN BUS interface having two pins via which the CAN BUS interface can be connected to a CAN network, a transmitter connected to the CAN BUS interface for transmitting signals via the CAN BUS interface, a receiver connected to the CAN BUS interface for receiving signals via the CAN BUS interface, and a CAN module, wherein the CAN module is connected to the pins and is adapted to adapt an output impedance between the pins, wherein the method is configured to change from a test phase to a response phase,
the method comprising, for the test phase, the steps a) to b):
controlling the CAN module by the processing unit such that the output impedance corresponds to a test impedance, and
controlling the transmitter by the processing unit such that the transmitter transmits a test signal representing at least one test message,
the method comprising, for the response phase, the steps c) to d):
controlling the CAN module by the processing unit such that the output impedance corresponds to a reference impedance, and
receiving a response signal via the receiver, the response signal representing at least one response message in response to the at least one test message of a previous test phase,
where the test impedance is smaller than the reference impedance,
wherein a reference response is stored by the CAN node, and
wherein the method is configured to change from the response phase to an evaluation phase, and wherein the method comprises, for the evaluation phase, the steps e) and/or f):
predicting a fault of the CAN network by the processing unit based on the at least one response message and the reference response, and
determining a fault location of the predicted or an existing fault of the CAN network by the processing unit based on the at least one response message and the reference response.

16. The method of claim 15, wherein the method comprises, for a reference phase, the following steps:
the processing unit controlling the CAN module such that the output impedance corresponds to the reference impedance,
the processing unit controlling the transmitter such that the transmitter transmits the test signal representing the at least one test message, and the receiver receives a reference response representing at least one response message in response to the at least one test message of the reference phase.

17. The method of claim 16, wherein the processing unit changes to an initiation phase after finishing the reference phase.

18. The method of claim 15, wherein the method comprises the following steps:
the processing unit changing directly or indirectly during a test cycle from the test phase in which the associated steps are executed to the response phase in which the associated steps are executed; and
the processing unit repeats the test cycle, wherein the test impedance for each repetition of the test cycle is reduced compared to the test impedance for a previous test cycle.

19. The method of claim 18, wherein the test impedance for each repetition of the test cycle is reduced by at least 5%, preferably by at least 10%, compared to the test impedance for the previous test cycle.

20. The method of claim 19, wherein the test cycle further comprises an initiation phase, and wherein the method comprising the following steps:

the processing unit controlling the CAN module such that the output impedance corresponds to the reference impedance, and the processing unit controlling the transmitter such that the transmitter sends an initiation signal announcing a test phase following the initiation phase.

* * * * *